United States Patent Office.

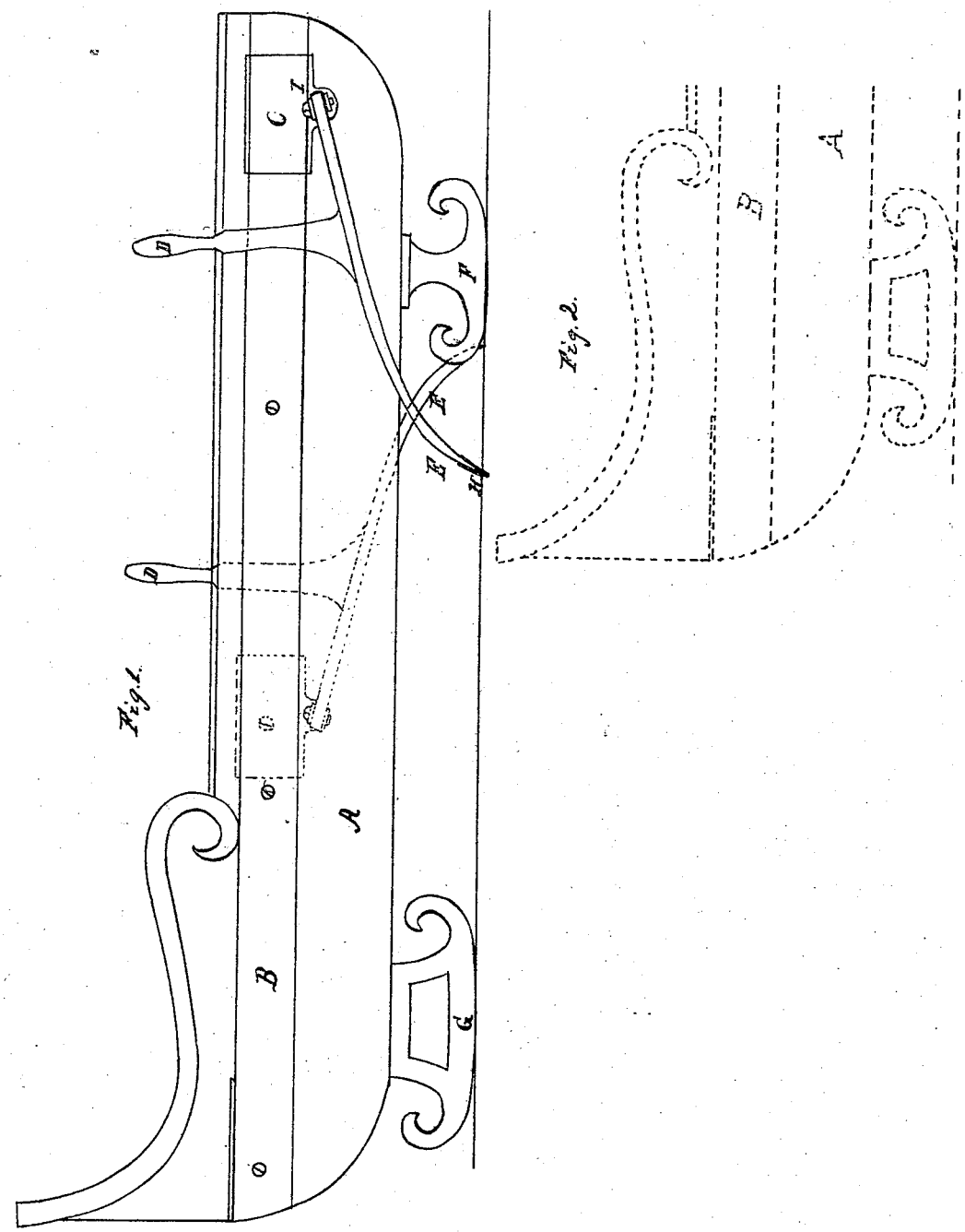

MARTIN NEWMAN, OF UNADILLA, NEW YORK.

Letters Patent No. 73,029, dated January 7, 1868.

IMPROVEMENT IN VELOCIPEDES.

*The Schedule referred to in these Letters Patent and making part of the same.*

TO ALL WHOM IT MAY CONCERN:

Be it known that I, MARTIN NEWMAN, of Unadilla, in the county of Otsego, and State of New York, have invented a new and useful Improvement in Velocipedes; and I do hereby declare that the following is a full, clear, and exact description of the construction and operation of the same, reference being had to the annexed drawings, making a part of this specification, in which—

Figure 1 is a longitudinal elevation.

Figure 2 is a section of a longitudinal elevation in dotted lines.

Fig. 1 is a longitudinal section, showing all the principal parts, in which A is the body or box of the velocipede. B B are rails secured to the sides of box A. C C are slides, which move freely over the rails B B; and E E are pawls attached to slide C C by means of a universal joint, J. D D are handles, by which the pawls E E are operated. H H show the point of the pawls in contact with ice or ground. G G are skate-runners at the rear end of A, and F is the guiding-runner at the forward end of A.

The nature of my invention consists in providing a suitable body or box of a velocipede with rails or guides, on which slides, or, as I should name it, sliding fulcra, so made that the sliding fulcra may pass freely over the length of the rails or guides. To these sliding fulcra are attached pawls, with handles, by which the pawls are operated. The pawls are connected with the sliding fulcra by means of a universal joint, which combination forms an easy and convenient mode of propelling velocipedes by hand-power.

To enable others skilled in the art to make and use my invention, I will proceed to describe its construction and operation.

I construct the body or box of my velocipede in any convenient or desirable form, and mounted on either runners or wheels, as circumstances require. On the sides of the body of the velocipede I secure rails or guides, of any suitable form or material, as shown at B B, fig. 1, and on these rails or guides I provide the sliding fulcra, as shown at C C, fig. 1, which may be made of metal or wood, but should be made to fit to the rails or guides so as to slide freely over their surfaces in a longitudinal direction. The sliding-fulcrum may be made to run in a groove, but I prefer to have the groove made in the sliding fulcrum and its interior surface corresponding with the exterior surface of the rails or guides, as shown at C C, fig. 1. On the sliding fulcrum C C are attached the pawls E E, with handles D D, and connected to the sliding fulcrum C by means of a universal joint, J, fig. 1. The body of the velocipede is shown in fig. 1 to be mounted on runners G G, and a guide-runner, F, which is operated by the foot in the usual manner for the purpose of steering or guiding the apparatus, but wheels may be substituted for the runner, as shown in the drawings.

Having described the construction of my invention, I will proceed to describe its operation. The rider or operator is supposed to be seated in the velocipede, fig. 1, and reach forth and grasp the handle D of the pawl E on the forward end of fig. 1, and as he pulls upon the handle it is apparent that the foot of the pawl E will be brought firmly to the ground, causing the pawl E to impinge securely to the surface of the ground or ice, as the case may be. It is apparent that the handle D cannot approach the rider, as the handle D is stationary, but the rider draws himself along, while in the act of pulling, up to the handle D and pawl E, as shown in fig. 2 in dotted lines. The rider now pushes the handles D forward, which carries the pawl back again on the sliding fulcrum C, to the forward part of the velocipede, ready for a repetition of the operation of pulling himself forward, as before. When the handle D is being pushed forward, the pawl E is lifted free from the surface of the ground or ice, so as not to impede progress or momentum of the velocipede. When it is desired to check the forward motion, or to stop the motion, it is only necessary to press the handle D firmly against the stop at the back end of the rail or guide B, which causes the pawl to act as a brake upon the surface of the ground or ice. The sliding fulcrum C, and pawl shown in dotted lines on the opposite of fig. 1, show the position of the handle D and pawl E reversed, in which position the rider can propel himself backward by pushing against the handle of the pawl. Both pawls D D may instantly be brought into position and worked together in concert, for propelling the velocipede either forward or backward, at pleasure, and when propelling the velocipede in curves or circles, the universal joint J accommodates itself to all these movements without cramping or binding.

What I claim as my invention, and desire to secure by Letters Patent, is—

The device for propelling velocipedes, constructed substantially as herein shown and described.

MARTIN NEWMAN.

Witnesses:
A. WHEELER,
L. NEWMAN.